United States Patent
Mansharof et al.

(10) Patent No.: US 9,568,738 B2
(45) Date of Patent: Feb. 14, 2017

(54) OPTICAL DEVICE HAVING A LIGHT TRANSMITTING SUBSTRATE WITH EXTERNAL LIGHT COUPLING MEANS

(71) Applicant: Lumus Ltd., Rehovot (IL)

(72) Inventors: Mali Mansharof, Rehovot (IL); Yaakov Amitai, Rehovot (IL)

(73) Assignee: LUMUS LTD., Rehovot (IL)

( * ) Notice: Subject to any disclaimer, the term of this patent is extended or adjusted under 35 U.S.C. 154(b) by 46 days.

(21) Appl. No.: 14/670,247

(22) Filed: Mar. 26, 2015

(65) Prior Publication Data
US 2015/0205141 A1    Jul. 23, 2015

Related U.S. Application Data

(62) Division of application No. 12/438,297, filed as application No. PCT/IL2007/001040 on Aug. 21, 2007, now Pat. No. 9,025,253.

(30) Foreign Application Priority Data

Aug. 22, 2006    (IL) .......................................... 177618

(51) Int. Cl.
| G02B 27/14 | (2006.01) |
| G02B 6/00 | (2006.01) |
| G02B 27/00 | (2006.01) |
| G02B 27/01 | (2006.01) |
| G02B 27/28 | (2006.01) |
| G02B 5/04 | (2006.01) |
| G02B 5/30 | (2006.01) |

(52) U.S. Cl.
CPC ................ *G02B 27/14* (2013.01); *G02B 5/04* (2013.01); *G02B 6/00* (2013.01); *G02B 27/0081* (2013.01);
(Continued)

(58) Field of Classification Search
CPC ....... G02B 5/04; G02B 5/1842; G02B 6/0011; G02B 6/0013; G02B 6/0015; G02B 6/0016; G02B 6/0018; G02B 6/0023; G02B 6/0033; G02B 23/02; G02B 23/12; G02B 23/125; G02B 27/01; G02B 27/0101; G02B 27/0103; G02B 27/017; G02B 27/0172; G02B 27/0189; G02B 2027/01; G02B 2027/0101; G02B 2027/0103; G02B 2027/0105; G02B 2027/0107; G02B 2027/017; G02B 2027/0172; G02B 2027/0174; G02B 2027/0178
(Continued)

(56) References Cited

U.S. PATENT DOCUMENTS 5,369,415 A    11/1994   Richard et al.
6,829,095 B2 *  12/2004   Amitai ................. G02B 6/0018
                                                          359/629
(Continued)

FOREIGN PATENT DOCUMENTS

BE            357371        2/1929
EP         1 385 023        1/2004
(Continued)

*Primary Examiner* — Arnel C Lavarias

(57) ABSTRACT

An optical device, includes a light-transmitting substrate having an input aperture and first and second major surfaces parallel to each other and edges, one partially reflecting surface located in the substrate which is non-parallel to the major surfaces of the substrate and an external optical arrangement having an output aperture optically attached to the input aperture of the substrate with the part of the substrate located next to the substrate input aperture, being substantially transparent.

5 Claims, 9 Drawing Sheets

(52) U.S. Cl.
CPC ....... G02B 27/0101 (2013.01); G02B 27/0172 (2013.01); G02B 27/286 (2013.01); G02B 5/30 (2013.01); *G02B 2027/0125* (2013.01)

(58) Field of Classification Search
USPC ....... 359/633, 629, 618, 630, 631, 632, 636, 359/637, 638, 639, 640, 1, 15, 19, 13; 385/129, 133; 353/20, 22, 30, 34, 38, 81, 385/82; 362/600, 615, 621, 623, 625, 362/626; 348/115
See application file for complete search history.

(56) References Cited

U.S. PATENT DOCUMENTS

| | | | |
|---|---|---|---|
| 7,457,040 B2 | 11/2008 | Amitai | |
| 7,576,918 B2 | 8/2009 | Goggins | |
| 7,724,441 B2 | 5/2010 | Amitai | |
| 8,004,765 B2 | 8/2011 | Amitai | |
| 9,025,253 B2 * | 5/2015 | Hadad | G02B 6/00 353/81 |
| 2003/0090439 A1 | 5/2003 | Spitzer et al. | |
| 2003/0218718 A1 | 11/2003 | Moliton et al. | |
| 2004/0085649 A1 | 5/2004 | Repetto et al. | |
| 2007/0159673 A1 | 7/2007 | Freeman et al. | |

FOREIGN PATENT DOCUMENTS

| | | |
|---|---|---|
| WO | WO 98/15868 | 4/1998 |
| WO | WO 03/058320 | 7/2003 |
| WO | WO 03/081320 | 10/2003 |
| WO | WO 2006/013565 | 2/2006 |
| WO | WO 2006/061927 | 6/2006 |
| WO | WO 2007/054928 | 5/2007 |

\* cited by examiner

OPTICAL DEVICE HAVING A LIGHT TRANSMITTING SUBSTRATE WITH EXTERNAL LIGHT COUPLING MEANS

CROSS REFERENCE TO RELATED APPLICATIONS

This application is a division of application Ser. No. 12/438,297 filed Oct. 9, 2009 for an Optical Device Having a Light Transmitting Substrate With External Light Coupling Means, now U.S. Pat. No. 9,025,253, granted on May 5, 2015.

BACKGROUND OF THE INVENTION

1. Field of the Invention

The present invention relates to substrate-guided optical devices, and particularly to devices which include a plurality of reflecting surfaces carried by a common light-transmissive substrate, also referred to as a light-guide element.

The invention can be implemented to advantage in a large number of imaging applications, such as head-mounted and head-up displays, cellular phones, compact displays, 3-D displays, compact beam expanders, as well as non-imaging applications like flat-panel indicators, compact illuminators and scanners.

2. Description of Related Art

One of the important applications for compact optical elements is in head-mounted displays where an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode (OLED) array, or a scanning source and similar devices, or indirectly, by means of a relay lens or an optical fiber bundle. The display comprises an array of elements (pixels) imaged to infinity by a collimating lens and transmitted into the eye of the viewer by means of a reflecting, or partially reflecting surface acting as a combiner for non-see-through and see-through applications, respectively. Typically, a conventional, free-space optical module is used for these purposes. As the desired field-of-view (FOV) of the system increases, however, such a conventional optical module becomes larger, heavier and bulkier, and therefore, even for a moderate performance device, is impractical. This is a major drawback for all kinds of displays, but especially in head-mounted applications, where the system must, of necessity, be as light and as compact as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box (EMB) of the optical viewing angles resulting from these designs is usually very small, typically less than 8 mm. Hence, the performance of the optical system is very sensitive, even to small movements of the optical system relative to the eye of the viewer, and does not allow sufficient pupil motion for convenient reading of text from such displays.

For a more detailed background of the present invention, the teachings included in the publications WO 01/95027, WO 03/081320, WO 2005/024969, WO 2006/013565, WO 2006/085309, WO 2006/085310, WO 2007/054928 and PCT/IL2007/000172 in the name of Applicant, are herein incorporated by references.

SUMMARY OF THE INVENTION

The present invention facilitates the design and fabrication of very compact light-guide optical elements (LOE) for, amongst other applications, head-mounted displays. The invention allows relatively wide FOVs together with relatively large EMB values. The resulting optical system offers a large, high-quality image, which also accommodates large movements of the eye. The optical system offered by the present invention is particularly advantageous because it is substantially more compact than state-of-the-art implementations, and yet it can be readily incorporated even into optical systems having specialized configurations.

The invention also enables the construction of improved head-up displays (HUDs). Since the inception of such displays more than three decades ago, there has been significant progress in the field. Indeed, HUDs have become popular and they play an important role, not only in most modern combat aircraft, but also in civilian aircraft, in which HUD systems have become a key component for low-visibility landing operation. Furthermore, there have recently been numerous proposals and designs for HUDs in automotive applications where they can potentially assist the driver in driving and navigation tasks. Nevertheless, state-of-the-art HUDs suffer several significant drawbacks. All HUDs of the current designs require a display source that must be offset a significant distance from the combiner to ensure that the source illuminates the entire combiner surface. As a result, the combiner-projector HUD system is necessarily bulky and large, and requires a considerable installation space, which makes it inconvenient for installation and at times even unsafe to use. The large optical aperture of conventional HUDs also poses a significant optical design challenge, rendering the HUDs with either compromised performance, or leading to high cost wherever high-performance is required. The chromatic dispersion of high-quality holographic HUDs is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can be readily installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

A further application of the present invention is to provide a compact display with a wide FOV for mobile, hand-held application such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with a poor image viewing quality. The present invention enables a physically compact display with a large virtual image. This is a key feature in mobile communications, and especially for mobile internet access, solving one of the main limitations for its practical implementation. Thereby the present invention enables the viewing of the digital content of a full format internet page within a small, hand-held device, such as a cellular phone.

A broad object of the present invention is therefore is to alleviate the drawbacks of state-of-the-art compact optical display devices and to provide other optical components and systems having improved performance, according to specific requirements.

The invention therefore provides an optical device, comprising a light-transmitting substrate having an input aperture and at least first and second major surfaces parallel to each other and edges, at least one partially reflecting surface located in said substrate which is non-parallel to the major surfaces of said substrate, optical means having an output aperture for coupling light into said substrate by total internal reflection, characterized in that said optical means for coupling light is located outside of said substrate, that the output aperture is optically attached to the input aperture of said substrate and that the part of the substrate which is located next to the substrate input aperture is substantially transparent.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein.

DETAILED DESCRIPTION OF THE PREFERRED EMBODIMENTS

The present invention relates to substrate-guided optical devices and particularly to devices which include a plurality of reflecting surfaces carried by a common light-transmissive substrate or to a LOE.

Figure 1:
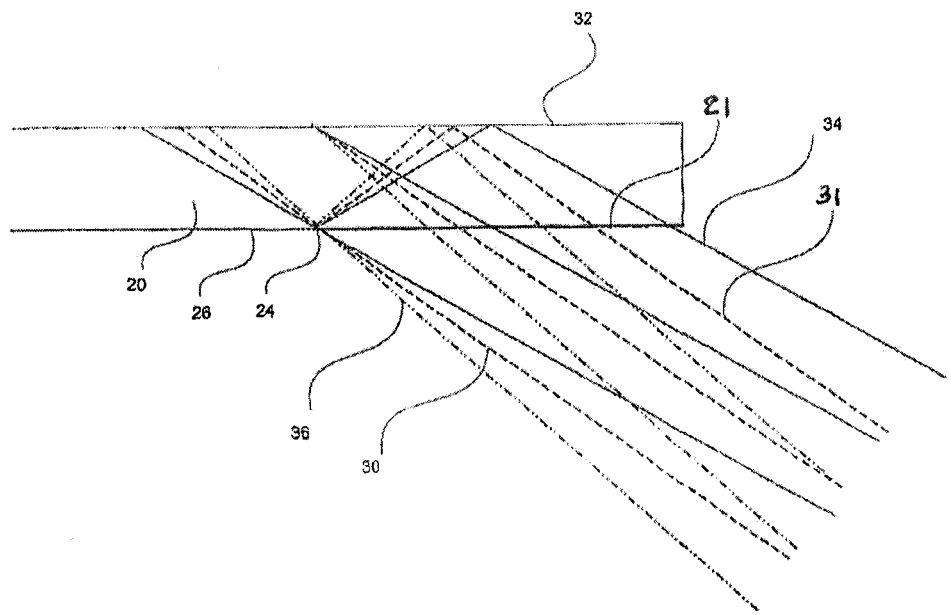
FIG. 1 illustrates a span of optical rays which are coupled into a light-guide optical element, according to the present invention.

According to the object of the present invention to find a coupling-in mechanism different to the coupling-in mechanism of the prior art, replacing the typically used input mirror, there is illustrated in FIG. 1 a span of rays that have to be coupled into a LOE, e.g., a substrate 20, with a minimal required input aperture 21. In order to avoid an image with gaps or stripes, the points on the boundary line 24, between the edge of input aperture 21 and the lower surface 26 of the substrate 20, should be illuminated for each one of the input light waves by two different rays that enter the substrate from two different locations: one ray 30 that illuminates the boundary line 24 directly, and another ray 31, which is first reflected by the upper surface 32 before illuminating the boundary line 24. The size of the input aperture 21 is usually determined by two marginal rays: the rightmost ray 34 of the highest angle of the FOV, and the leftmost ray 36 of the lowest angle of the FOV.

Figure 2:
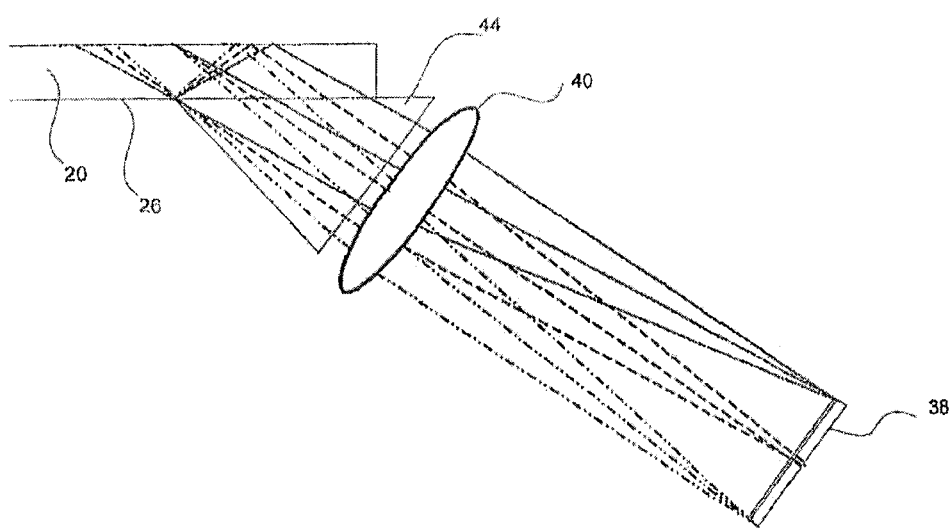
FIG. 2 is a diagram illustrating an embodiment for coupling light into a light-guide optical element, according to the present invention.

The simplest possibility to couple these rays into the substrate 20 is illustrated in FIG. 2. Here, the input light waves source 38, as well as the collimating lens 40, are oriented at the required off-axis angle compared to the major plane of the substrate 20. A relay prism 44 is located between the collimating lens 40 and the substrate 20 and is optically cemented to the lower surface 26, such that the light from the display source is trapped inside the substrate by total internal reflection. Although the optical system illustrated here is simple, it still suffers from a major drawback in that the overall optical system is large and cumbersome, and does not conform to the external shape of an eyeglasses display, as well as to a hand-held display.

Figure 3:
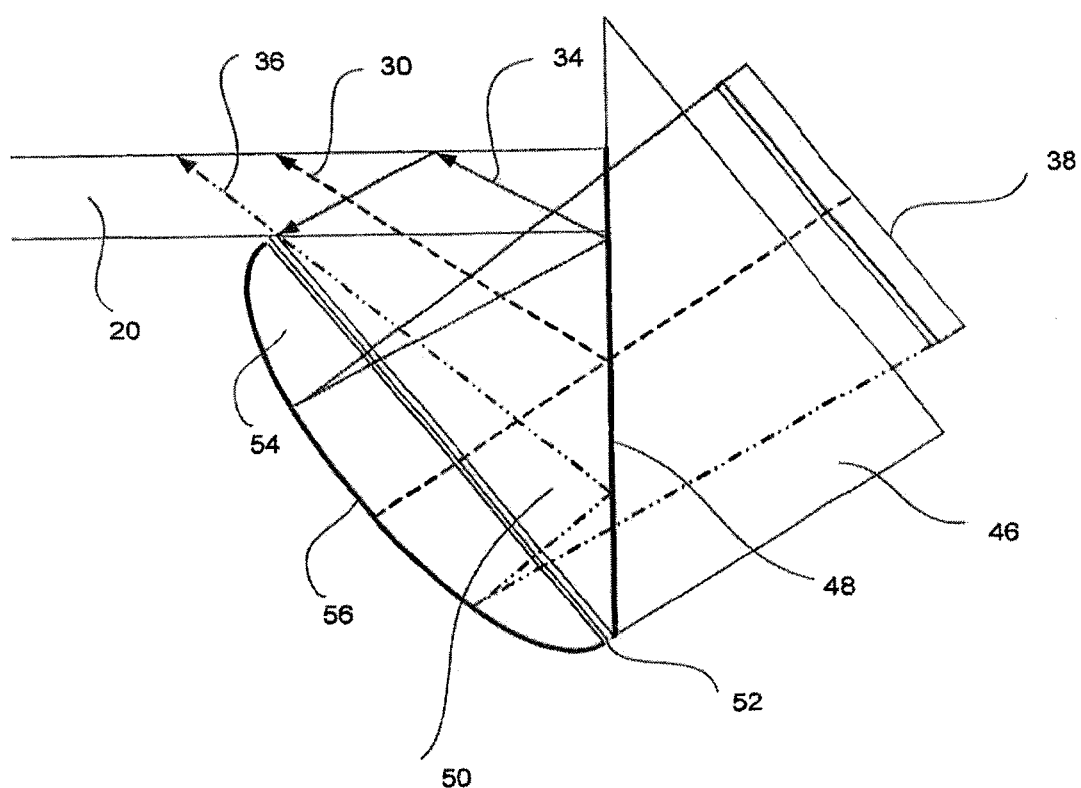
FIG. 3 is a diagram illustrating an embodiment for coupling light into a light-guide optical element utilizing a coupling prism, according to the present invention.
Figure 4:
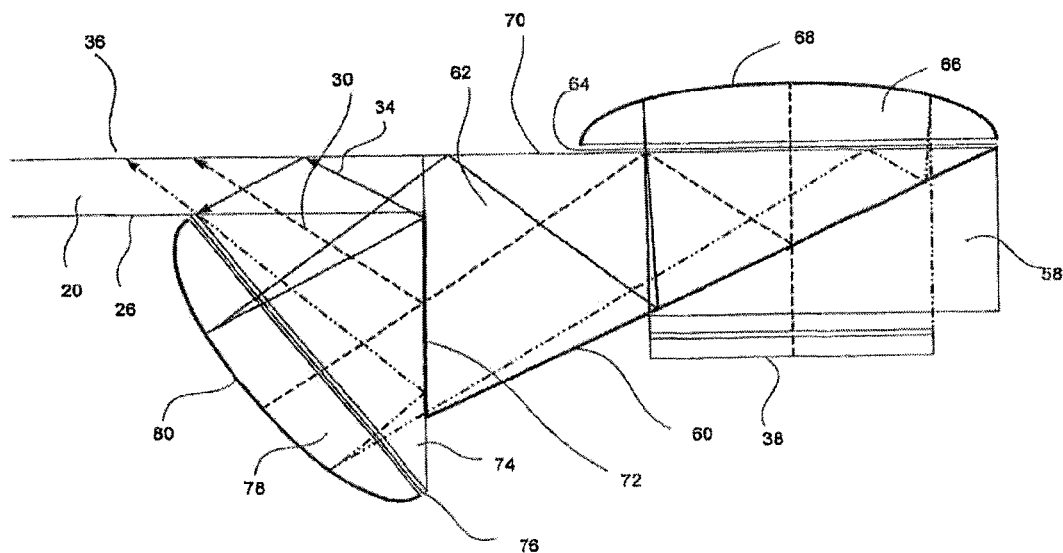
FIG. 4 is a diagram illustrating an embodiment for coupling light into a light-guide optical element utilizing two coupling prisms, according to the present invention.

Therefore, the challenge is to find a method to fabricate a compact collimating module which can couple light into an LOE having a simple configuration, wherein the overall shape and size of this module conforms to most of the relevant applications. A method which achieves these two seemingly contradictory requirements and which exploits the fact that in most microdisplay sources, such as LCD or LCOS, light is linearly polarized, is illustrated in FIG. 3. The main difference between this embodiment and that of FIG. 2 is that the optical collimating module is folded, and hence, its volume and weight are significantly reduced. Moreover, its mechanical elements can be easily attached to almost any relevant optical system. As illustrated, the p-polarized input light waves from the input light waves source 38 pass through a first relay prism 46, a polarizing beamsplitter 48 and a second relay prism 50. The light waves then pass through the quarter-wavelength retardation plate 52, are collimated by a lens 54, e.g., a plano-convex lens, at its reflecting surface 56, which from there are returned again to pass through the retardation plate 52 and re-enter the second relay prism 50. The now s-polarized light waves are reflected from the polarizing beamsplitter 48 and enter the substrate 20 through the lower surface 26. The optical module which is illustrated in FIG. 3 is much more compact than that of FIG. 2. For most applications, however, this module is still not compact enough. For example, assume a display source having a lateral extent of nun, a horizontal FOV of 22° and prisms having a refractive index of ~1.51 yields a distance of ~35 mm between the input light waves source 38 and the collimating lens 54. Moreover, for many applications a single reflecting collimating surface might not be sufficient to achieve the required optical performance of low aberrations and distortion. Therefore, an even more compact version having two reflecting collimating surfaces is presented, as illustrated in FIG. 4. The s-polarized input light waves from the input light waves source 38 pass through a first relay prism 58, a first polarizing beamsplitter 60 and a second relay prism 62. The waves then pass through the quarter-wavelength retardation plate 64, are partially collimated by the first lens 66 at its reflecting surface 68, returned again to pass through the retardation plate 64, and re-enter the second relay prism 62. The now p-polarized light waves are reflected from the first polarizing beamsplitter 60 and following total internal reflection off the upper surface 70 pass through a second polarizing beamsplitter 72 and a third relay prism 74. The waves then pass through the quarter-wavelength retardation plate 76, are collimated by the second lens 78 at its reflecting surface 80, returned again to pass through the retardation plate 76, and re-enter the third relay prism 74. The now s-polarized light waves are reflected from the second polarizing beamsplitter 72 and enter the substrate 20 through the lower surface 26. Since the optical way between the input light waves source 38 and the last collimating surface 80 is now thrice folded, the optical module can be much more compact than that of FIG. 3. Moreover, better optical performance can be achieved by utilizing the two collimating elements 68 and 80.

Two different polarizing beamsplitters are utilized in the module illustrated above. While the first one 60 transmits an s-polarized light and reflects a p-polarized light, the second one 70 has the opposite function, that is, it transmits a p-polarized light and reflects an s-polarized light. These two different beamsplitters may be materialized utilizing the wire-grid technology which is described in one of Applicant's previous patent Applications. In the present case, the wires of the beamsplitters 60 and 70 are oriented parallel and normal to the figure plane, respectively.

The second relay prism 62 is optically cemented to the left edge of the substrate 20, as illustrated in FIG. 4. The reason for doing so is that the leftmost rays of the optical waves (such as ray 34) pass from the prism 62 through the surface 26 into the third prism 74. There are cases, however, where it is required to separate between the edge of the substrate 20 and the edge of the collimating module, for example, in eyeglasses display applications, wherein the substrate should be assembled inside the eyeglasses frame.

Figure 5:
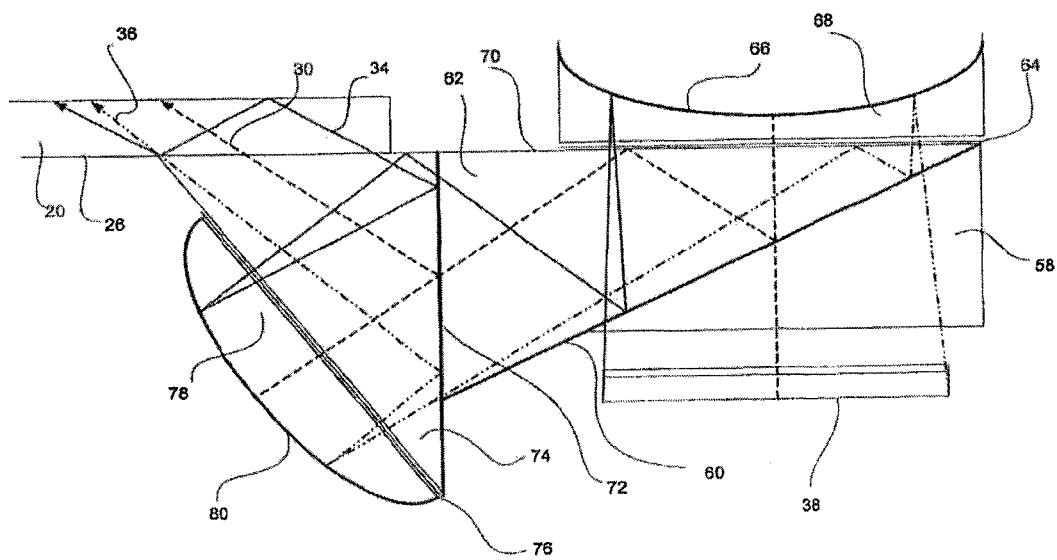
FIG. 5 is a diagram illustrating another embodiment for coupling light into a light-guide optical element utilizing two coupling prisms, according to the present invention.

FIG. 5 illustrates a modified version where the upper surface 70 of the prism 62 is aligned with the lower surface 26 of the substrate, rather than with the upper surface 28 as illustrated in FIG. 4. In this case, not only the external shape of the module should be modified, but the optical design of the collimating lenses should be modified as well, in order to adjust the new optical module to the required focal length along with the desired performances.

Figure 6:
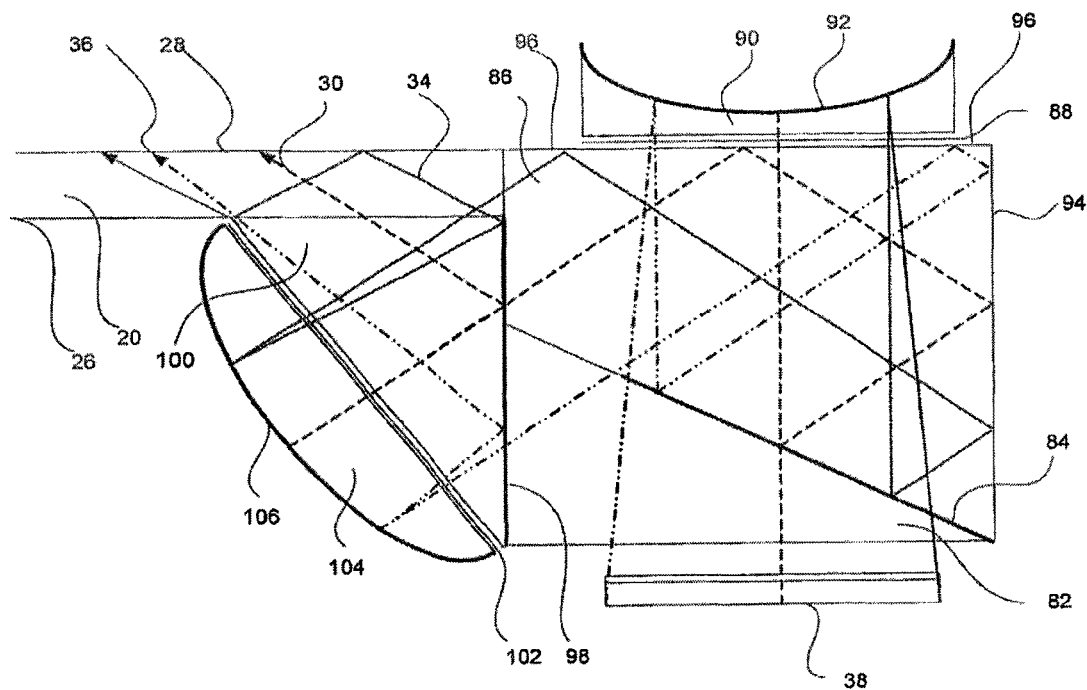
FIG. 6 is a diagram illustrating a yet another embodiment for coupling light into a light-guide optical element utilizing two coupling prisms, according to the present invention.
Figure 7:
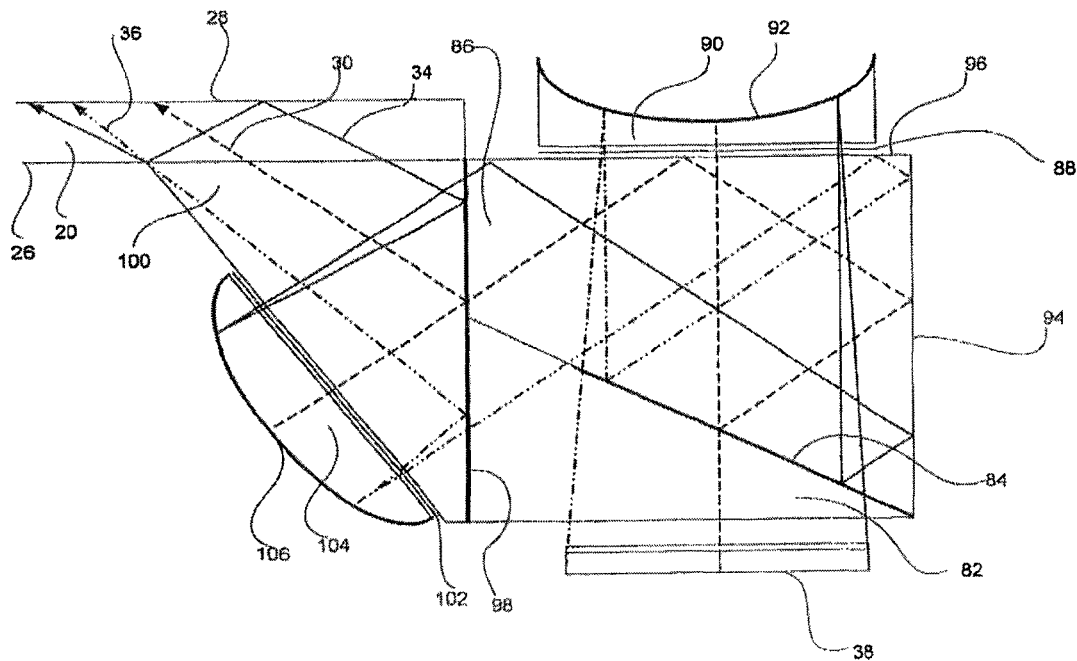
FIG. 7 is a diagram illustrating a yet another embodiment for coupling light into a light-guide optical element utilizing two coupling prisms, according to the present invention.

The collimating optical modules illustrated in FIGS. 4 and 5 are only examples of different embodiments to reduce the volume of the required module. Even more compact modules, where a larger number of folding surfaces are utilized, are illustrated in FIGS. 6 and 7. As shown, the s-polarized input light waves from the input light waves source 38 pass through a first relay prism 82, a first polarizing beamsplitter 84 and a second relay prism 86. The waves then pass through the quarter-wavelength retardation plate 88, are partially collimated by the first lens 90 at its reflecting surface 92, returned again to pass through the retardation plate 88, and re-enter the second relay prism 86. The now p-polarized light waves are reflected from the first polarizing beamsplitter 84 and following reflection off the reflecting surface 94 and total internal reflection off the upper surface 96 pass through a second polarizing beamsplitter 98 and a third relay prism 100. The waves then pass through the quarter-wavelength retardation plate 102, are collimated by the second lens 104 at its reflecting surface 106, returned again to pass through the retardation plate 102, and re-enter the third relay prism 100. The now s-polarized light waves are reflected from the second polarizing beamsplitter 98 and enter the substrate 20 through the lower surface 26. Since the optical path between the input light waves source 38 and the last collimating surface 106 is now folded four times, the optical module can be much more compact then that of FIGS. 4 and 5. As before, the difference between the modules illustrated in FIGS. 6 and 7 is that the upper surface 96 of the collimated module in FIG. 6 is aligned with the upper surface 28 of the substrate 20 and the right edge of the substrate is optically cemented to the left edge of the second prism 86, while the upper surface 96 in FIG. 7 is aligned with the lower surface 26 of the substrate 20.

In all the modules illustrated in FIGS. 4 to 7, the input light waves source 38 is assembled at the rear part of the optical module. This arrangement is especially advantageous for systems wherein the display source is an LCD and a backlight module should be added to the back side of the display, however, there are systems wherein the display source is an OLED, which does not require a backlight module, and usually has a very flat shape. In this case, it is possible to place the display source at the front part of the optical module, that is, at the same level as the LOB, and an even more compact module might be produced.

Figure 8:
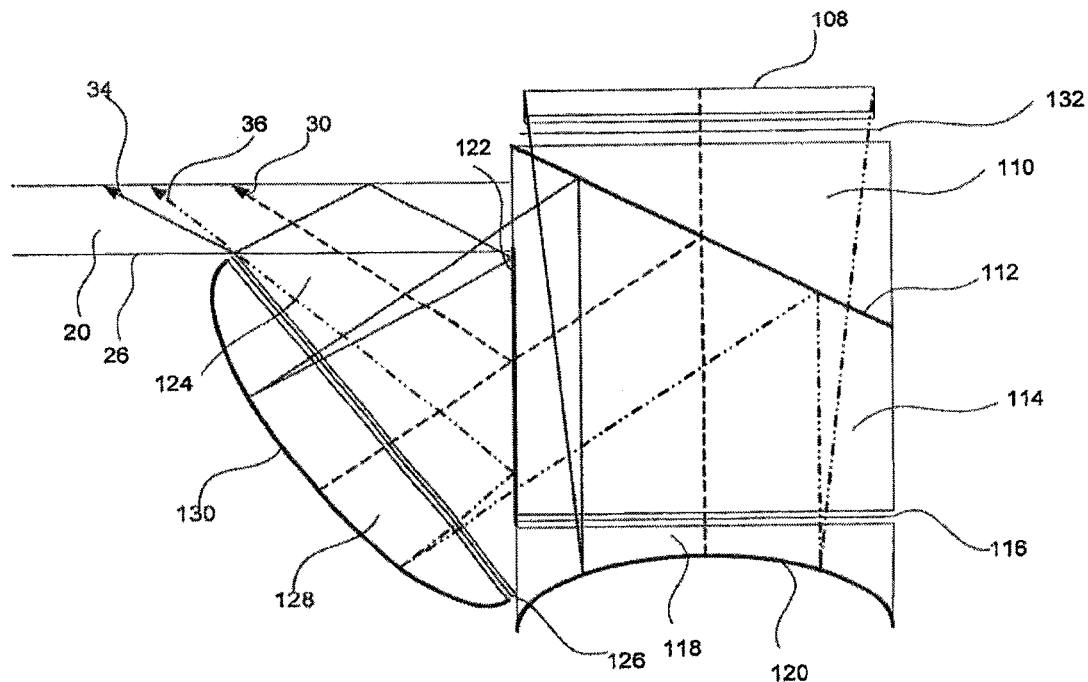
FIG. 8 is a diagram illustrating a further embodiment for coupling light from an OLED into a light-guide optical element utilizing two coupling prisms, according to the present invention.

In FIG. 8, the s-polarized input light waves from the display source 108 pass through a first relay prism 110, a first polarizing beamsplitter 112 and a second relay prism 114. The waves then pass through the quarter-wavelength retardation plate 116, are partially collimated by the first lens 118 at its reflecting surface 120, returned again to pass through the retardation plate 116, and re-enter the second relay prism 124. The now p-polarized light waves are reflected from the first polarizing beamsplitter 112 and pass through a second polarizing beamsplitter 122 and a third relay prism 124. The waves then pass through the quarter-wavelength retardation plate 126, are collimated by the second lens 128 at its reflecting surface 130, returned again to pass through the retardation plate 126, and re-enter the third relay prism 124. The now s-polarized light waves are reflected from the second polarizing beamsplitter 122 and enter the substrate 20 through the lower surface 26. Usually the light from an OLED is unpolarized, in which case, in order to avoid scattering from the undesired p-polarized light from the OLED, an s-polarizer 132 must be inserted between the display source 108 and the first relay prism 110.

Another advantage of the proposed imaging method illustrated here manifests itself when utilizing an LCOS device as the display source. Like LCD panels, LCOS panels contain two-dimensional array of cells filled with liquid crystals that twist and align in response to different voltages. With LCOS, the liquid crystal elements are grafted directly onto a reflective silicon chip. According to the liquid crystals twist following reflection of the mirrored surface below, the polarization of the light is either changed or unchanged, respectively. This, along with a polarizing beamsplitter, modulates the light and creates the image. In addition, the reflective technology means the illumination and imaging light beams share the same space. Both of these factors necessitate the addition of a special beam-splitting element to the optical module in order to enable the simultaneous operations of the illuminating, as well as the imaging functions. The addition of such an element would normally complicate the optical module and when using an LCOS as the display source, the arrangements illustrated in FIG. 2 would become even larger. For the imaging method illustrated in FIG. 8, however, it is readily possible to add the illuminating unit to the optical module without significantly increasing the volume of the system.

Figure 9:
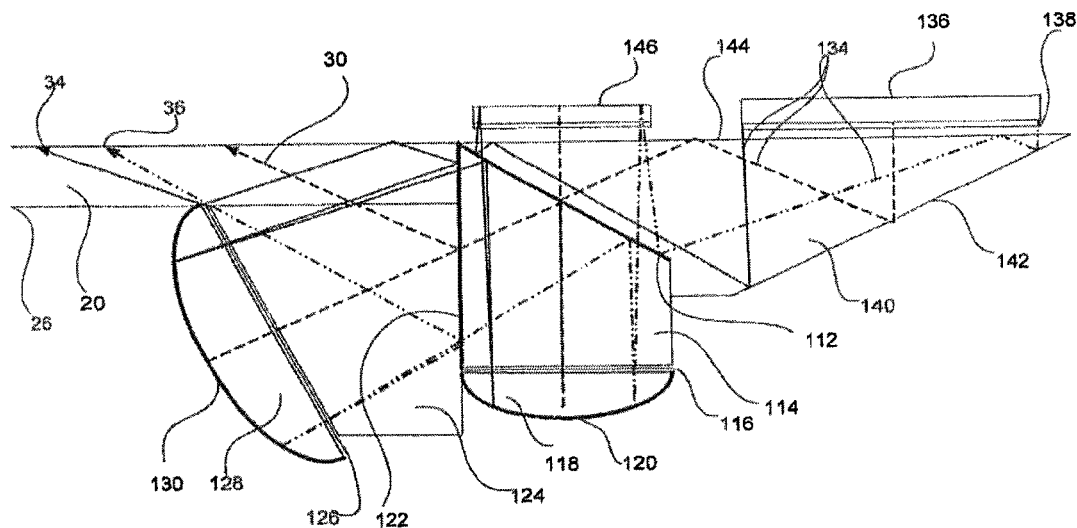
FIG. 9 is a diagram illustrating a method for coupling light from an LCOS into a light-guide optical element utilizing three coupling prisms, according to the present invention.

Referring to FIG. 9, the illuminating light waves 134 from the light source 136 pass through an s-polarizer 138 and are coupled into the substrate 140 by the first reflecting surface 142. Following total internal reflection off the upper surface 144 of the substrate, the waves are reflected and coupled-out off a polarizing beamsplitter 112 to illuminate the LCOS display source 146. Naturally, the number of elements that could be utilized in the collimating module is not limited to two.

Figure 10:
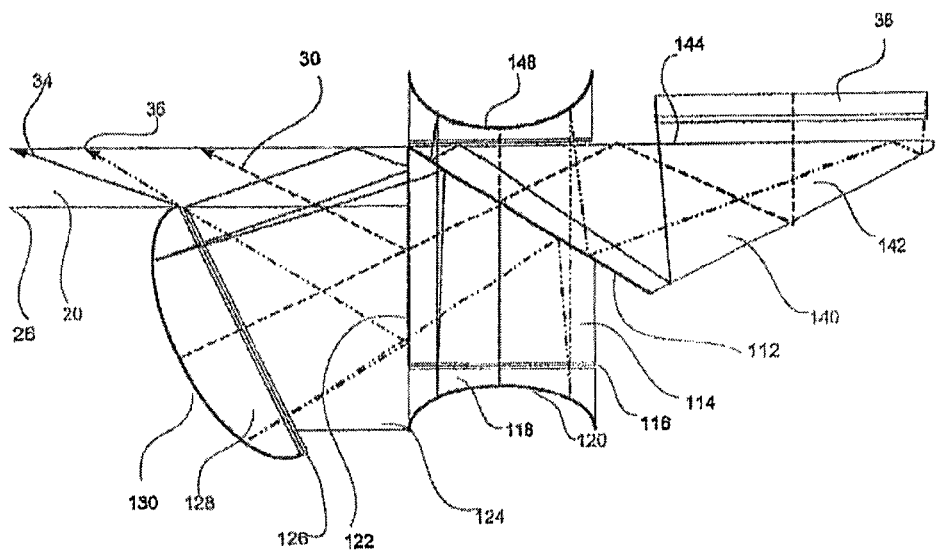
FIG. 10 is a diagram illustrating an embodiment for coupling light from an LCD into a light-guide optical element utilizing three coupling prisms and three lenses, according to the present invention.
Figure 11:
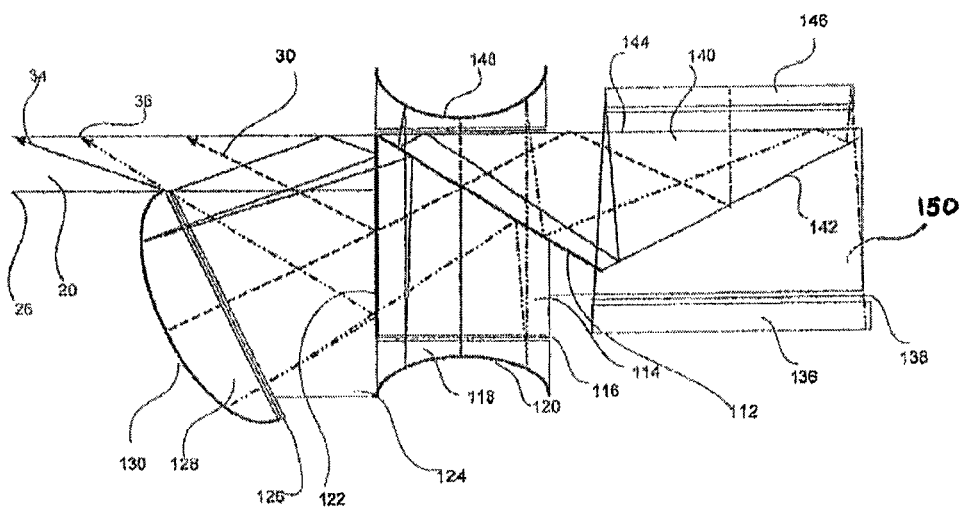
FIG. 11 is a diagram illustrating an embodiment for coupling light from an LCOS into a light-guide optical element utilizing three coupling prisms and three lenses, according to the present invention.

FIGS. 10 and 11 illustrate a collimating lens, having an LCD and an LCOS as the display sources respectively, wherein a third lens 148 is added to the optical train. In FIG. 11 another relay prism 150 is added in order to enable the waves from the light source 136 to illuminate the LCOS 146. In general, for each specific system, the number and types of lenses in the optical collimating module will be set according to the required optical parameters, desired performance and the volume allowed.

In all the optical collimating modules illustrated in FIGS. 2 to 11, the off-axis angles of the span of the rays that have to be coupled into the substrate, are set by the collimating module. There are cases, however where it is required to utilize a collimated light waves that impinges the substrate, normal to the substrate plane. In these cases, an alternative coupling-in mechanism should replace the input mirror or the prior art.

Referring to FIG. 7 of Publication WO 2005/024969, another problem relating to the input mirror 16 of the Publication, which is embedded inside the substrate 20, is associated with the angular range of the optical waves which can be coupled inside the LOB by total internal reflection. Similarly to that illustrated in FIG. 1, in order to avoid an image with gaps or stripes, the points on the boundary line between the edge of the input mirror 16 and the upper surface of the substrate 20 should be illuminated for each one of the input waves by two different rays that enter the substrate from two different locations. To enable this requirement, it is necessary to fulfill the following condition:

$$\alpha_{sur} > \alpha_{in}^{max}, \quad (1)$$

wherein:
  $\alpha_{in}^{max}$ is the maximal off-axis angle of the coupled waves inside the substrate 20, and
  $\alpha_{sur}$ is the off-axis angle of the input mirror.

Assuming that the central wave of the source is coupled out of the substrate 20 in a direction normal to the substrate surface 26, that the off-axis angle of the central coupled wave inside the substrate 20 is $\alpha_{in}$ and that the FOV inside that substrate is $\alpha_F$, yields:

$$\alpha_{sur} > \alpha_{in} + \frac{\alpha_F}{2}. \quad (2)$$

The angle $\alpha'_{sur}$ between the input mirror and the substrate plane is:

$$\alpha'_{sur} - \frac{\alpha_{in}}{2}, \quad (3)$$

wherein:

$$\alpha'_{sur} - 90° - \alpha_{sur} \quad (4)$$

Combining Eqs. (2)-(4) yields:

$$\alpha_{sur} > 60° + \frac{\alpha_F}{6}. \quad (5)$$

Inserting Eqs. (3)-(4) into Eq. (5) yields:

$$\alpha_{in} < 60° + \frac{\alpha_F}{3}. \quad (6)$$

For most applications, $\alpha_F > 12°$, and therefore, $\alpha_{in} < 56°$. For many applications, it is preferred that the off-axis angle of the coupled waves inside the LOE will be higher, e.g., between 60°-75°, or even higher. Another related problem is associated with the maximal possible FOV. Assuming that the refractive index of the substrate is ~1.51, the minimal off-axis angle inside the substrate is 42°.

Combining Eqs. (9)-(13) yields:

$$\alpha_F < 21.6°. \quad (7)$$

As a result, the maximal FOV in the air that can be coupled inside the LOE is lower than ~33°. Hence, utilizing the input mirror of the prior art, which is embedded inside the LOE for coupling-in the incoming waves, imposes limitations on the FOV of the image, as well as the angular range of the coupled waves inside the LOE.

Figure 12A:
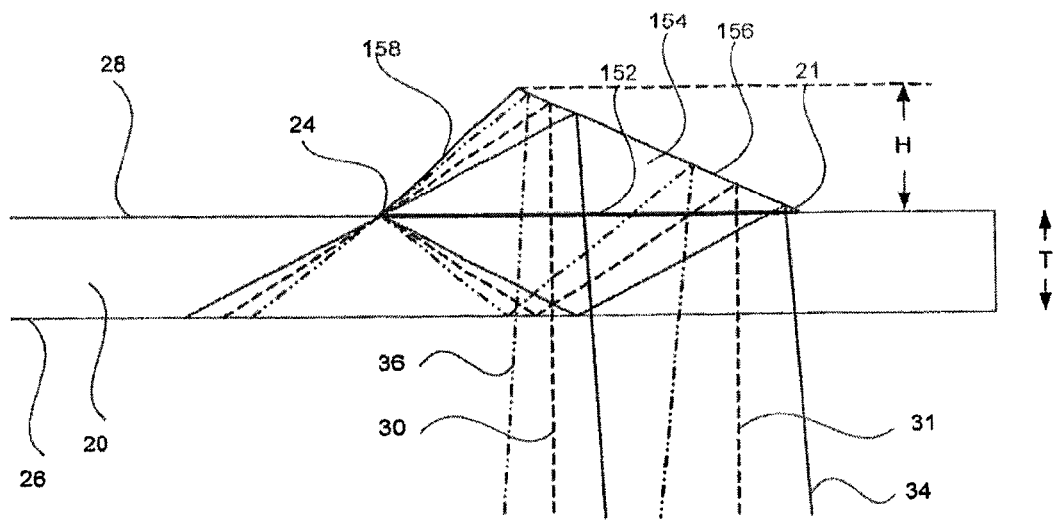
FIGS. 12a and 12b are diagrams illustrating other embodiments for coupling light into a light-guide optical element utilizing a single coupling prism, according to the present invention.

As illustrated in FIG. 12a, the lower surface 152 of a coupling-in prism 154 is optically cemented to the substrate 20 at the upper surface 28 of the substrate. The collimated light waves from the display source (not shown) pass through the substrate 20 and the prism 154 and are then reflected from the reflecting surface 156. After again passing through the prism 154, the light waves are coupled into the substrate by total internal reflection. Similarly to that illustrated above in FIG. 1, in order to avoid an image with gaps or stripes, the points on the boundary line 24 between the lower surface 152 of the prism 154 and the upper surface 28 of the substrate 20 should be illuminated for each one of the input waves by two different rays that enter the substrate from two different locations: one ray 30 first passes through prism 154, is reflected by the reflecting surface 156, and from there, illuminates the boundary line 24. Another ray 31, is first reflected by the reflecting surface 156 and then by the lower surface 26 of the substrate 20, before illuminating the boundary line. The size of the input aperture is usually determined by two marginal rays: the rightmost ray 34 of the highest angle of the FOV and the leftmost ray 36 of the lowest angle of the FOV. To avoid undesired reflections from the left surface 158, it can be coated by an opaque obstructive layer. Since the height H of the prism 154 could be larger than the thickness T of the substrate 20, the off-axis angles of the coupled waves inside the substrate 20 can be larger than the off-axis angle of the reflecting surface 156. As a result, the images have a much wider FOV with no limitation on the maximal off-axis angles, and therefore, may be coupled into the substrate.

Figure 12B:
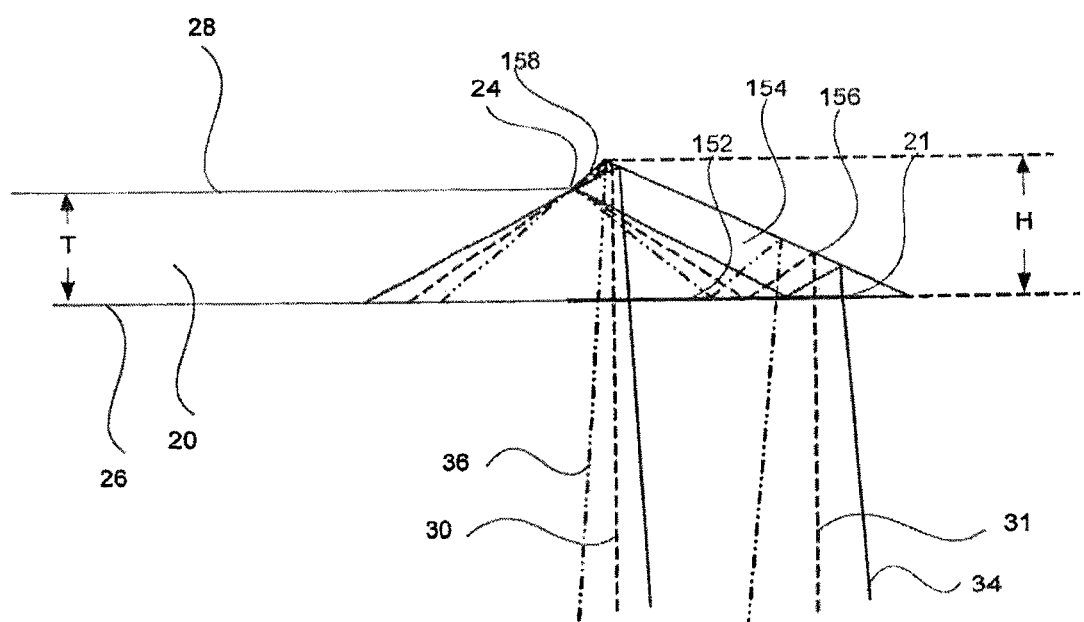

FIG. 12b illustrates a modified version of the coupling-in prism 154 wherein the lower surface 152 of the prism is oriented co-linear to the lower surface 26 of the substrate 20. Although the fabrication process of the combined prism-substrate element is more complicated its advantage is that the volume of the entire optical system is much smaller.

Figure 13:
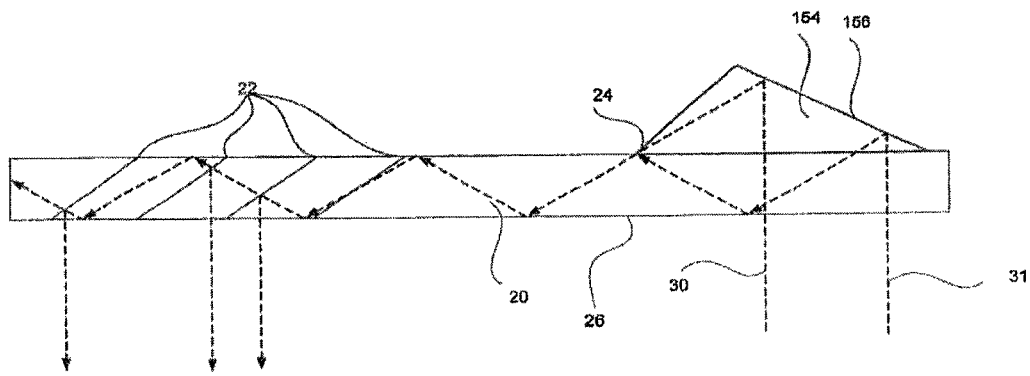
FIG. 13 is a diagram illustrating a view of a device for coupling light into a light-guide optical element utilizing a single coupling prism, according to the present invention.

As illustrated in FIG. 13, the off-axis angle of the coupled waves 30, 31 inside the substrate 20 is larger than the off-axis angle of the coupling-in reflecting surface 156, as well as that of the coupling-out partially reflecting surface 22. In the Publication WO 01/95027, there is described a system having off-axis angles of the coupled waves which are larger than the off-axis angles of the coupling-out partially reflecting surfaces. The off-axis angle, however, of the coupling-out partially reflecting surfaces in that case is fairly small, e.g., approximately 30°, which yields a system having a large number of partially reflecting surfaces and hence, an optical element which is complicated to fabricate. On the other hand, utilizing the coupling-in mechanism of the present invention, an optical system having an off-axis angle of the coupling-in reflecting source 156, as well as that of the coupling-out partially reflecting surfaces 22, of between 50° to 60° can easily be fabricated. In this case, the off-axis angle of the central coupled wave 30 inside the substrate 20, will be between 62° to 80°.

So far, it was assumed that the partially reflecting surfaces are either coated with angular-sensitive coatings or have polarization-sensitivity characteristics. For images with a relatively narrow FOV however, it is also possible to utilize a much simpler solution wherein the desired reflections can be achieved with the Fresnel reflections from the surfaces. That is, instead of coating the surfaces, a thin air gap can be inserted between the uncoated surfaces.

Figure 14:
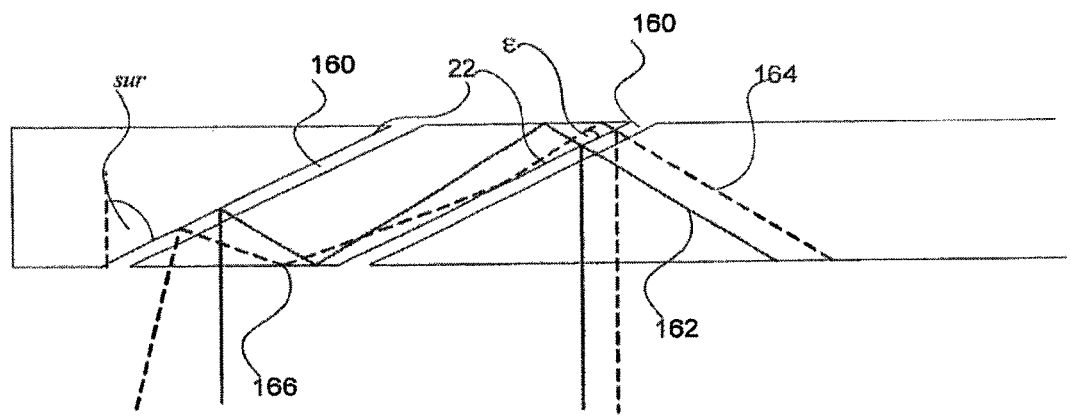
FIG. 14 is a diagram illustrating an embodiment for coupling light out of a light-guide optical element utilizing air gaps, according to the present invention.

FIG. 14 illustrates a substrate, wherein air gaps 160 are inserted between the coupling-out surfaces 22. The main drawback of this configuration is the undesired reflectance of the rays having an internal angle of $\alpha_{in}$. Apparently, the point in the display source, is reflected into the directions $\alpha_{sur}-\epsilon$ and $180-\alpha_{sur}+\epsilon$ inside the substrate. While the ray 162 with the off-axis direction $180-\alpha_{sur}+\epsilon$ is reflected by the partially reflecting surfaces 22 into the required output direction, the ray 164 with the direction $\alpha_{sur}-\epsilon$ is reflected by the partially reflecting surfaces 22 into the undesired output direction $\alpha_{sur}+\epsilon$. The reflected ray 166 is then reflected in an undesired direction $2\epsilon$, which creates a ghost image. Although only a small part of the beam is reflected in the undesired direction, the effect thereof becomes more significant as the FOV is increased; it can disturb the viewer, especially at the extreme of the FOV.

Despite the fact that the undesired reflections described above cannot be avoided, the problem of ghost images can be solved by changing the angle of the first reflective surface 22. For instance, if this angle is changed to $\alpha_{sur}-63°$, the other parameters of the system become:

$\alpha_{in}-54°;\alpha_{sur}-63°;\epsilon-9°$.

Hence, if the FOV of the system is 16° and the refractive index of the substrate is 1.51, the maximal off-axis angle of the image inside the substrate is 60°, the direction of the undesired reflection is 66°, and the output angle will be 18°, which is outside the FOV and, with proper design, will not illuminate the exit pupil. In addition to the ghost image phenomena, there is another problem; dark stripes are produced by the undesired reflections of the rays having the direction $\alpha_{sur}-\epsilon$ by the partially reflecting surfaces 22 into the undesired output direction $\alpha_{sur}+\epsilon$. The dark stripes problem becomes more severe as $\epsilon$ becomes larger. In addition, since the stripes appear mainly at the left part of the couple-out aperture of the substrate, the problem is more severe for the lower angles in the FOV. As a result, for systems having a central input angle $\alpha_{in}$ which is smaller than the surface's off axis angle $\alpha_{sur}$, $\epsilon$ is larger for the lower angles of the FOV, therefore the stripes problem is intensified in this region. With the optical design presented here, it is possible to fabricate an LOB having a central input angle $\alpha_{in}$ which is larger than the surface off axis angle $\alpha_{sur}$. In that case $\epsilon$ becomes smaller for the lower angles of the FOV and the stripes problem is significantly decreased.

Figure 15:
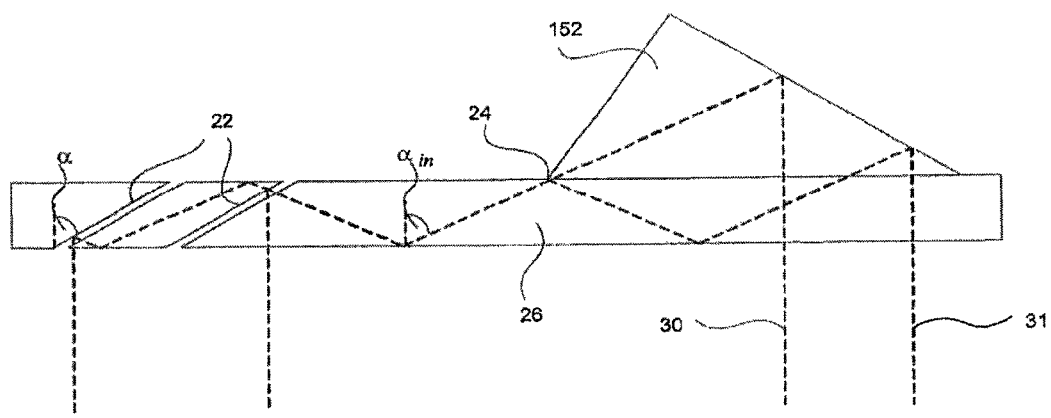
FIG. 15 is a diagram illustrating another view of a device for coupling light out of a light-guide optical element utilizing air gaps, according to the present invention.

As illustrated in FIG. 15, the off axis angle $\alpha_{in}$ of the coupled waves 303 inside the substrate 20 is larger than the off-axis angle $\alpha_{sur}$ of the coupling-out partially reflecting surfaces 22 and the stripes problem is indeed reduced.

In all the optical collimating modules illustrated in FIGS. 2 to 11, the off-axis angles of the span of the rays that have to be coupled into the substrate are set by the collimating module, wherein in the modules illustrated in FIGS. 12 to 15, the collimated light waves impinge the substrate normal to the substrate plane. In the later cases, reflecting elements which are attached to the upper surface of the substrate, produce the coupling-in mechanism which replace the input mirror of the prior art.

Figure 16:
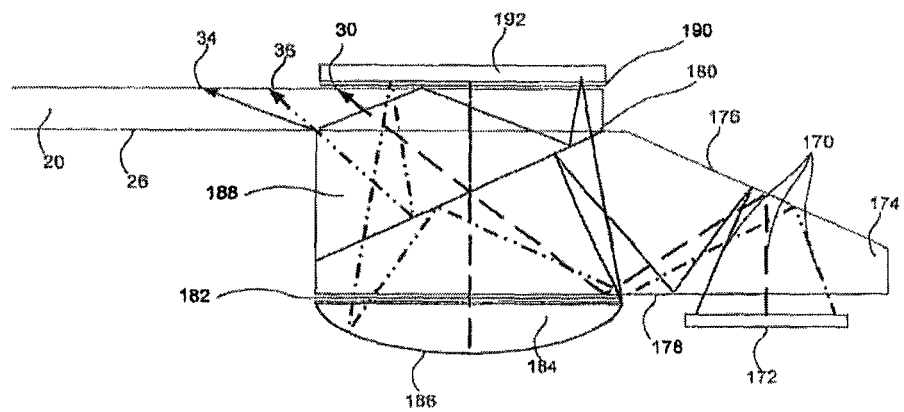
FIG. 16 is a diagram illustrating an embodiment for coupling light from an LCD into a light-guide optical element, utilizing a reflecting surface which is located next to one of the major surfaces of the light-guide optical element, according to the present invention.
Figure 17:
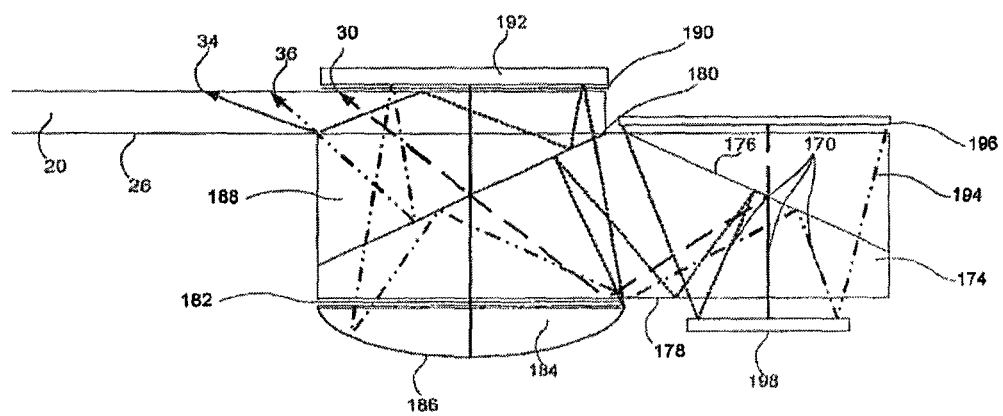
FIG. 17 is a diagram illustrating an embodiment for coupling light from an LCOS into a light-guide optical element, utilizing a reflecting surface which is located next to one of the major surfaces of the light-guide optical element, according to the present invention.

FIGS. 16 and 17 illustrate an intermixed solution wherein a collimating module and a reflecting element which are attached to the lower and the upper surfaces of the substrate respectively, are combined to form a compact coupling-in mechanism. As illustrated in FIG. 16, the s-polarized light waves 170 from the light source 172 are coupled into the substrate 174 by the reflecting surface 176. Following total internal reflection off the lower surface 178 of the substrate, the waves are reflected and coupled-out off a polarizing beam-splitter 180. The waves then pass through the quarter-wavelength retardation plate 182, are collimated by the lens 184 at its reflecting surface 186, returned again to pass through the retardation plate 182, and re-enter substrate 174. The now p-polarized light waves pass through the polarizing beamsplitter 180 and a relay prism 188. The waves then pass through the LOE 20 and a second quarter-wavelength retardation plate 190, are reflected by the reflecting surface 192, returned again to pass through the retardation plate 190 and the LOE 20, and re-enter the relay prism 188. The now s-polarized light waves are reflected from the polarizing beamsplitter 180 and enter the LOE 20 through the lower surface 26. In FIG. 17 another relay prism 194 is added in order to enable the waves from the light source 196 to illuminate the LCOS 198. The flat reflecting surface 192 in FIGS. 16 and 17 can be replaced by a reflecting lens. In that case the collimating of the light waves is performed by the combined optical power of the reflecting surfaces 186 and 192.

In all the optical modules illustrated in FIGS. 1 to 17, the input aperture of the LOE, namely, substrate 20, is located adjacent to one of its two major surfaces. The output aperture of the optical means for coupling light into the substrate by total internal reflection (which is located outside of said substrate), is optically attached to the input aperture of the LOB, wherein the optical waves are reflected by a reflecting element which is located outside of the LOE and slanted at an angle to the major surfaces of the LOE. In addition, the part of the LOE which is located next to the LOB's input aperture is essentially transparent and does not contain any reflecting surfaces or any other optical elements. Therefore, the fabrication process of such an LOE would be much simpler than those of the prior art. Moreover, during the assembly process, it is possible to determine the exact orientation of the LOB and the exact place of the input aperture.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical device, comprising:
   a light-transmitting substrate having an input aperture and at least first and second major surfaces parallel to each other and edges;
   at least one partially reflecting surface located in the substrate and oriented at an off-axis angle with respect to a normal to the major surfaces of the substrate;
   optical means including at least one reflecting surface for coupling light waves from a display source into the substrate, by total internal reflection; and
   at least one imaging lens, having at least two surfaces,
   wherein the reflecting surface is oriented at an angle to the major surfaces of the substrate, such that directions of the light waves impinging on the reflecting surface are changed, so that the light waves are trapped inside the substrate by total internal reflection, and
   the reflecting surface is located outside the substrate, is not between the planes of the two major surfaces of the substrate, and is not parallel to any of the major surfaces or edges of the substrate.

2. The optical device according to claim 1, wherein at least part of the reflecting surface is not located between the major surfaces of the substrate.

3. The optical device according to claim 2, wherein the optical means includes at least one transparent prism having a plurality of surfaces.

4. The optical device according to claim 3, wherein one of the surfaces of the transparent prism is constituted by the reflecting surface.

5. The optical device according to claim 3, wherein one of the surfaces of the transparent prism is optically attached to one of the major surfaces of the substrate.

* * * * *